United States Patent [19]

Knebel

[11] 3,707,952
[45] Jan. 2, 1973

[54] COMPRESSION RELEASE MECHANISM FOR TWO STROKE ENGINES USED TO BRAKE A VEHICLE

[76] Inventor: Andrew W. Knebel, 15444 S.E. 144th St., Renton, Wash. 98055

[22] Filed: Aug. 20, 1970

[21] Appl. No.: 65,515

[52] U.S. Cl..................123/97 B, 123/182, 180/30, 180/92
[51] Int. Cl..........................F01l 13/08, F02n 17/08
[58] Field of Search..........123/182, 97 B; 180/30, 92

[56] References Cited

UNITED STATES PATENTS

| | | | |
|---|---|---|---|
| 3,638,632 | 2/1972 | Boling | 123/182 |
| 3,667,435 | 6/1972 | Bygdnes | 123/97 B |
| 1,047,499 | 12/1912 | Clement | 123/182 |
| 1,691,953 | 11/1928 | Bacci et al. | 123/182 |

FOREIGN PATENTS OR APPLICATIONS

| | | | |
|---|---|---|---|
| 106,561 | 5/1917 | Great Britain | 123/182 |
| 134,657 | 11/1919 | Great Britain | 123/182 |
| 371,519 | 4/1932 | Great Britain | 123/182 |
| 1,010,320 | 6/1957 | Germany | 123/182 |
| 26,931 | 9/1913 | Great Britain | 123/182 |
| 414,688 | 9/1910 | France | 123/182 |
| 178,228 | 9/1953 | Austria | 123/182 |
| 1,017,913 | 9/1954 | France | 123/182 |

*Primary Examiner*—Al Lawrence Smith
*Attorney*—Roy E. Mattern, Jr.

[57] ABSTRACT

A compression release mechanism is adapted for incorporation into the cylinder head combustion chamber structure of a two stroke, or two cycle, internal combustion engine to produce, when desired, a braking action to slow down a vehicle, such as a motorcycle. The compression release mechanism includes: a housing adapted to be threaded into the combustion chamber structure at a braking exhaust port provided to receive this mechanism; a braking valve positioned through the compression release housing and spring biased using a spring and its retainer to keep the braking valve in its normally closed position; an exhaust passageway network within the housing commencing at the braking exhaust port and terminating in multiple passageways, each with orifices able to discharge fluids into the atmosphere as the fluids come from the combustion chamber; valve balls used with each orifice to move clear of their seats and against their retaining structure as engine fluids flow out into the atmosphere, and to move in the opposite direction, under atmospheric and differential pressures, against their seats as outside air, generally laden with dust and dirt, attempts to enter the combustion chamber during such engine braking periods; and an enclosed cable control means adaptable to be secured at one end for pivotal actuation at a hand control location of a vehicle after its opposite end has been quickly and removably secured to the compression release mechanism by the convenient placement of its large abutment cable end in a lower restraining space, chamber, or recess in the compression release housing and immediately passing the cable, per se, respectively through aligned slots in this housing of the compression release mechanism, through the valve ball retainer and beyond through the combined valve stem retainer and valve spring retainer where the flexible control cable cover is secured, so upon control lever pivotal action, as the cable cover is caused to increase its curvature, the braking release valve is opened against the force of its return biasing spring and braking occurs.

3 Claims, 4 Drawing Figures

PATENTED JAN 2 1973 3,707,952
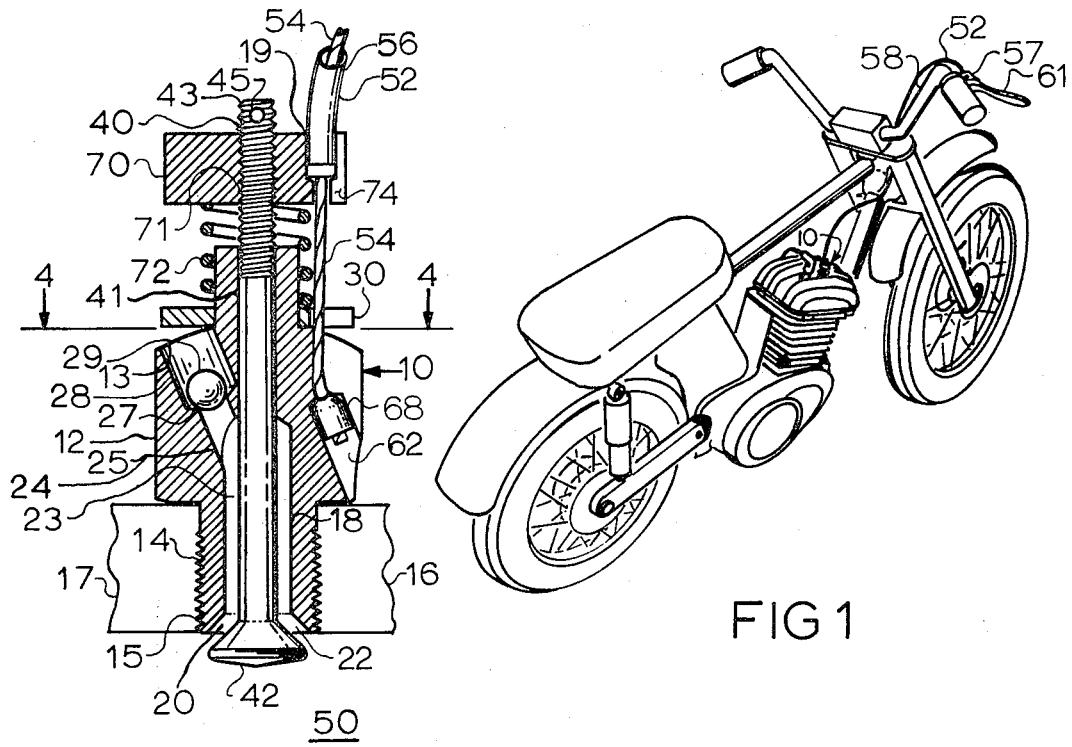
FIG 2
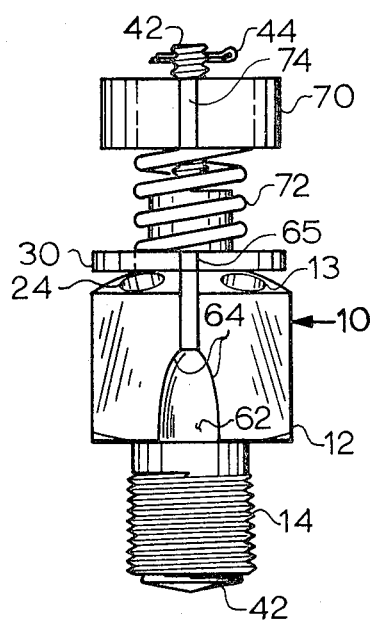
FIG 3
FIG 1
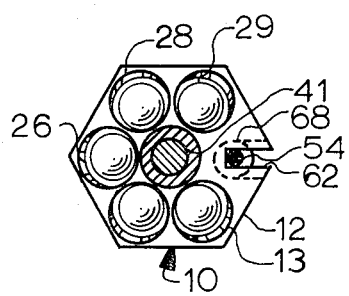
FIG 4
INVENTOR.
ANDREW W. KNEBEL
BY
Roy E Mattern Jr.
ATTORNEY

COMPRESSION RELEASE MECHANISM FOR TWO STROKE ENGINES USED TO BRAKE A VEHICLE

BACKGROUND OF THE INVENTION

Mr. Thommen in January 1957, in his U.S. Pat. No. 2,778,349, illustrates and describes a vacuum brake, for two stroke engines for motor vehicles. It utilized a valve ball. He stated, "The brake action of two-stroke engines is very slight as compared with that of four-stroke engines when the ignition is disconnected. Therefore, in the case of long descents, mechanical brakes are very much stressed, and they are frequently overloaded. Strong heating of the brakes takes place and the brake linings are much worn, quite apart from the fact that the wheel bearings become strongly heated, which is often connected with a great loss of grease."

Therefore, by his invention, he provided a means by "which a partial vacuum is produced in the interior of the cylinder and in that the ignition is short-circuited simultaneously therewith."

Later, in Sept. 1968, in Cycle Magazine on pages 73, 74, and 75, Mr. Joseph Hemmer discusses compression releases for two stroke engine braking. He says, "The free wheeling effect of modern two strokes can be radically reversed by adding one of the new generation of compression releases: ideal for flattracking and trailing.

Modern high-powered two-strokes were notably short of compression braking until the recent re-emergence of the compression release. Earlier compression releases could be used to shut down engines, but were inadequate for seriously slowing an entire motocycle.

The recently developed releases give two-stroke engines substantially more braking effect than equivalent four-strokes. The braking effect is so strong with most 360's that it becomes impractical to use the release in low gear; the rear wheel almost locks. This drastic improvement in braking efficiency is given by the larger orifice sizes in the new compression releases. The braking effect of a release is generated by pumping air back and forth through a small hole. The piston pushes air out through the release valve on the up stroke and sucks air in through the valve on the downstroke. It drags both ways. The braking effect can be optimized by correctly sizing the orifice for the contrasting variables of flow resistance and pumped volume. The older releases had enough flow resistance, but they did not pump enough air to give an appreciable braking effect.

Imagine a cylinder with the top end closed. If the piston is pushed up near the end, the compressed air will act as a spring, and return the piston to its original position, with no net drag. Now open a small hole in the end. Note that some of the air is pushed out, and the piston does not return all the way, but instead has to be dragged back to its original position. Aha! It works! If we open a slightly larger hole in the end, it drags even better. However, if we get carried away and open a tremendous hole, the air in the cylinder will move out without being compressed, and will follow the piston back down without causing any suction, and so will not give any braking effect. There is an optimum hole size that is small enough to allow the air to be compressed, but still large enough to allow most of it to pass out in the time available. If the engine speed is increased, there is less time for the air to pass through the hole. A slightly larger hole is therefore better at higher engine speeds. Thus, the optimum size of the orifice is determined by two factors: the cylinder volume and the rotating speed.

The equation for the relationship between cylinder size, orifice diameter, and engine RPM appears to be: $d^2 = kVN$ where d is orifice diameter (inches), $V$ is cylinder column, ($cc$), $N$ is engine rpm, and $k$ is a constant. Evaluating the constant at a known point.

In addition to the braking effect, compression releases have two extra advantages: they can be used to ease the piston over top center for starting, and for clearing out a flooded engine. The exchange of air that cleans out a flooded engine brings two undesirable side effects: a hot, high revving, marginally lubricated engine might be stuck by a blast of raw air into the cylinder; a cool, slow turning enduro bike with mud plastered on the cylinder head will have fantastically short ring life is an unfiltered compression release is used. The piston pumps air out on the up stroke, and sucks air in on the down stroke. If a gob of mud happens to be in the way, it comes in also. In the course of a long, muddy run, mud gets baked onto the top of the piston, and the underside of the head, and the rings wear alarmingly.

Existing unfiltered compression releases can be modified to exclude dirt reasonably well without compromising any of their uses. Perhaps the accessory manufacturers will get around to building something that actually works; it is even barely possible that the factories might include well-designed releases as standard equipment on their dirt bikes. Until that distant (?) day, modifications are in order. Whether modifying an existing compression release, or manufacturing a proper one from scratch, the basic principles are the same: 1. Keep the spring cool. 2. Keep the discharge tube short. 3. Keep the filter open.

Examining these principles in detail, we find

1. The cylinder head temperature on a hot two-stroke runs up aroung 500° to 600° F. These temperatures are well into the tempering range of common spring steels. If the spring is isolated from the head and exposed to the air stream, its temperature will stay below the softening range. If it is enclosed, it will lose strength and the compression release will hiss like a sick snake.

2. Clearing out a flooded engine is one of the major advantages of a compression release on a racing two-stroke. To get a good exchange of fresh air, the cylinder volume must be much larger than the air space inside the release and discharge tube system. Too long or too large a discharge tube will result in the loaded air mixture being pumped up and down the discharge tube without fresh air exchange. In practice ⅜ inch tubing 6 to 8 inches long works very satisfactorily.

3. To keep mud and sand out of the open end of the discharge tube, a cover and an air filter must be provided. Since the filter is subjected to hot combustion gasses, plastic filter materials melt. The oil in the gasses promptly saturates and plugs paper air filters, so that paper is not suitable either. Metallic mesh is not subject to either of the above problems. Stainless steel or bronze mesh kitchen pot cleaners make satisfactory filters. A wire cross wise through the end of the end of the discharge tube will hold the pot cleaner in place, and a strip of one-fourth inch hardware cloth wired around the pot cleaner will keep it together. A satisfactory cover for the filter mesh can be made from a short piece of inner-tube. Pull the inner-tube over the filter like a sock, and wire the top closed to protect the mesh from mud splash. Let the open bottom end of the inner-tube hang down about an inch.

In conclusion, please keep in mind that although a properly set up compression release does not replace a good front brake, it will very effectively improve deceleration under competition or trailing conditions."

SUMMARY OF THE INVENTION

A compression release mechanism for two stroke engines to be operated when braking of a vehicle is intended, is compactly arranged with multiple passageways, each having orifices equipped with valve balls that quickly open and close the orifices automatically as the compression release mechanism is actuated during engine braking periods. The multiple passageways are arranged in part both parallel to and slightly inclined to the release valve axis providing for excellent flow characteristics of exhausting fluids, and providing for excellent valve ball return motions into contact with their respective orifice structures, so any potential incoming air, often laden with dust and dirt is very quickly blocked from entering the engine interior.

The axial opening movement of the release valve against its biasing spring is undertaken by moving a pivoting control lever, located near other vehicle hand controls, which actuates an enclosed control cable that is quickly installed and removed. Initially before the cable control lever is installed, the anchored cable end, having an abutment secured to it, is quickly and conveniently slipped up into a captive chamber or recess in the housing of the compression release mechanism and it then remains there until the control lever is removed. The cable per se, at this anchored end passes through accommodating clearance slots in the housing and retainers before entering its protective flexible cover that is inturn anchored to the release valve spring retainer.

As constructed, mounted and operated, the compression release mechanism operates quickly, accurately and reliably during effective braking, while protecting the engine interiors from dust, dirt, and other unwanted debris. Yet at all times it may be quickly serviced, because the anchored end of the control cable is conveniently and quickly removed without damage to itself or the housing. Upon removal it is conveniently dropped down and out of a restrictive slotted chamber or recess in the housing of the compression release mechanism.

DESCRIPTION OF THE DRAWINGS OF A PREFERRED EMBODIMENT

FIG. 1 is a perspective view showing portions of a motorcycle and its engine which are connected to the various components of the compression release mechanism;

FIG. 2 is a vertical cross-sectional view of the compression release device components at a cylinder head location;

FIG. 3 is a side view of the compression release device showing the cable anchoring means, this view being taken at 90° with respect to FIG. 2; and FIG. 4 is a horizontal cross-sectional view taken along line 4—4 of FIG. 2.

DESCRIPTION OF A PREFERRED EMBODIMENT

As illustrated in the figures, the compression release mechanism 10, has a vale housing 12 with a threaded portion 14 which complements the threaded port of opening 15 in a cylinder head 16 of an engine 17, shown in part in FIG. 1. This valve housing 12 has a special bore 18 which is divided into a main enlarged passageway or channel portion 20 having a flared entry 22 at one end, and a distribution chamber or junction 23 at its other end, and into plurality of small passageways 24 continuing on from the distribution chamber 23 to the outside of valve housing 12 at exhaust ports 13, providing multiple flow paths 24 located closely adjacent to the stem 41 of the release valve 40. Each passageway 24 after leaving junction 23 is of a smaller diameter at 25 and then is enlarged in diameter at 26 creating a valve ball seat 27 at this changeover and also a larger passageway 28 to accommodate the movement of a valve ball 29 between seat 27 and its ultimate restraint by its retainer 30 serving also as a spring retainer. The valve balls 29 when so controlled in movement serve a one way valve function, thus a fluid stream may move from the interior of the engine 17 via the channel 20, junction 23, passageway 24, around the ball 29, and out exhaust ports 13 into the atmosphere 32, but incoming fluids, often containing dust, dirt and other debris are blocked as the valve balls 29 reseat ahead of them.

The main channel flared entry 22 complements a tapered release valve head 42 on valve stem 41 of valve 40. Movement of valve 40 opens or closes main channel portion 20 and thus the compression is controlable within the interior 50 of cylinder head 16 of engine 17 shown in part.

Referring to FIG. 4, which is a cross-section taken from FIG. 2 along line 4—4, junction 23 is observed as being a distribution chamber where five small passageways 24 commence their short run by valve ball seats 27 and valve balls 29 and on to exhaust ports 13. Their immediate enlarged total cross-sectional area of these passageways 24 provides almost an immediate contact with the surrounding atmosphere in reference to the engine interior 50. Thus, the special bore 18 of valve housing 12 between engine interior 50 and atmosphere 32 is properly sized and is kept as short as possible which produces the most efficient and effective engine cylinder compression release control and consequently excellent braking action when needed.

As observed in FIGS. 1 and 2, movement of valve 40 is undertaken by operating control linkage means 52 which comprises a cable 54 slidably guided and protected within a sleeve 56 and a manually operated by lever means 57 secured to the handle bars 58 of a motorcycle 59 shown in part. The sleeve 56 is secured to the body 60 of the lever means 57 and the cable 54 is secured to the lever 61. At their opposite ends, the cable 54 is secured to the release valve housing 12 and the sleeve 56 is inserted into recess 19 of the valve cap 70. The attachment of cable 54 to valve housing 12 is undertaken by securing an enlarged swaged end fitting or abutment 68 to cable 54 and providing a recess or chamber 62 with inside shoulders 64 to receive and confine the abutment 68 from upward travel. Also, a slotted entry 65 is provided to accommodate the upstanding portions of the cable 54 as cable 54 is drawn tightly into sleeve 56. Additional slots 65 and 74 to accommodate the cable 54 are respectively provided in the valve ball retainer 30 and valve stem retainer 70.

As control lever 61 is pivoted, cable 54 is shortened, causing sleeve 56 to conform to an arc of lesser radii. This inturn causes sleeve 56 to bear against the valve stem retainer 70 which then moves and carries valve head 42 into the engine interior 50, against the force of its bias spring 72. This active open position of the compression release mechanism 10 is shown in FIG. 2, whereas, its closed inactive position is illustrated in FIG. 3.

After initially threading on the valve retainer 70 using its threads 71 and threads 43 on valve stem 41, a cotter pin 44 is inserted, in part, through the transverse hole 45 in the valve stem 41 to insure the retention of valve retainer 70 during operations. Generally the compression release valve 40 is located near an engine spark plug 35. Preferably cable clearance slots 65 and 74 are made in respective retainers 30 and 70, and they are aligned with slotted entry 65 in housing 12.

SUMMARY OF ADVANTAGES OF THE INVENTION

A compact, substantially axial flow compression release mechanism is easily installed, operated, maintained and removed. Its operation, inturn, gives maximum engine braking performance without endangering an engine by excessive wear caused by dust, dirt, and debris that might otherwise enter during such compression release braking of a two stroke engine. The compression release operation is sufficiently effective to eliminate any possible combustion of a fuel air mixture and yet it is not severe enough to cause skidding of the vehicle tires. There is no need for flow through filtering devices to supplement the valve ball one way flow operations to insure the cleanliness of the engine interiors.

I claim:
1. A compression release mechanism, for internal combustion engines, used during engine braking operations of a vehicle, comprising:
  a. a multiple passageway hollow housing adapted for convenient securement to an engine cylinder head over a port in a combustion chamber, having the passageways arranged parallel to and then slightly at an angle to provide the most favorable flow paths for discharging engine fluids during the engine braking;
  b. a compression release valve seated and slidably retained in part of the hollow housing and extending beyond it;
  c. a valve spring retainer secured to the extending valve portion;
  d. an additional valve spring retainer, serving also as a valve ball retainer, positioned on the hollow housing;
  e. a valve spring positioned between the valve spring retainers to retain the compression release valve in a closed position;
  f. valve ball means confined within the multiple passageway hollow housing to block the entry of dust, dirt and debris into an engine and to reopen the hollow housing to allow discharge of engine fluids to the atmosphere when the compression release valve is opened; and
  g. control means secured at least between the valve spring retainer on the extending valve portion and the hollow housing to move the valve spring retainer closer to the hollow housing against the force of the biased valve spring and thereby move the compression release valve so the engine fluids will be discharged into the atmosphere as engine braking occurs slowing down a vehicle.

2. A compression release mechanism, for internal combustion engines, used during engine braking operations of a vehicle, comprising:
  a. a multiple passageway hollow housing adapted for convenient securement to an engine cylinder head over a port in a combustion chamber;
  b. a compression release valve seated and slidably retained in part of the hollow housing and extending beyond it;
  c. a valve spring retainer secured to the extending valve portion;
  d. a valve spring positioned between the valve spring retainer and the housing and biased to retain the compression release valve in a closed position;
  e. valve ball means confined within the multiple passageway hollow housing to block the entry of dust, dirt and debris into an engine and to reopen the hollow housing to allow discharge of engine fluids to the atmosphere when the compression release valve is opened; and
  f. a control means, comprising in turn, an enclosed control cable, with its cable being movable at one end by a lever means adapted for attachment to vehicle operating controls, and being removably secured at its other end by this end being enlarged and being constrained against an abutment in the hollow housing; the cable enclosure of the control cable being secured to the vehicle operating controls and restrained at its other end in the valve spring retainer that is in turn secured to the extending valve portion, whereby the cable enclosure moves the valve against the bias spring force when the cable cover is caused to conform to a smaller radii curvature as the control cable is shortened upon movement of the lever means, and the hollow housing and valve spring retainer are slotted in line to provide unhampered movement of the control cable.

3. A compression release mechanism, as claimed in claim 2, having a valve ball retainer positioned on the hollow housing and then serving also as an additional valve spring retainer at opposite end of the spring and having an in line slot to provide unhampered movement of the control cable.

* * * * *